US007791218B2

(12) United States Patent
Mekky et al.

(10) Patent No.: US 7,791,218 B2
(45) Date of Patent: Sep. 7, 2010

(54) E-LATCH WITH MICROCONTROLLER ONBOARD LATCH AND INTEGRATED BACKUP SENSOR

(75) Inventors: Tony Mekky, Andover (GB); Mirko Pribisic, North York (CA); Jonathan Bagg, Courtice (CA); Boguslaw Bombski, Etobicoke (CA)

(73) Assignee: Intier Automotive Closures Inc., Newmarket, Ontario (CA)

( * ) Notice: Subject to any disclaimer, the term of this patent is extended or adjusted under 35 U.S.C. 154(b) by 848 days.

(21) Appl. No.: 10/579,436

(22) PCT Filed: Nov. 15, 2004

(86) PCT No.: PCT/CA2004/001958

§ 371 (c)(1),
(2), (4) Date: Feb. 8, 2007

(87) PCT Pub. No.: WO2005/047628

PCT Pub. Date: May 26, 2005

(65) Prior Publication Data

US 2007/0145821 A1 Jun. 28, 2007

Related U.S. Application Data

(60) Provisional application No. 60/519,499, filed on Nov. 13, 2003.

(51) Int. Cl.

| | |
|---|---|
| ***B60L 1/00*** | (2006.01) |
| ***B60L 3/00*** | (2006.01) |
| ***H02G 3/00*** | (2006.01) |

(52) U.S. Cl. .......................... 307/10.1; 307/64; 307/66

(58) Field of Classification Search ............... 307/10.1, 307/64; 292/201

See application file for complete search history.

(56) References Cited

U.S. PATENT DOCUMENTS

| | | | | |
|---|---|---|---|---|
| 5,497,641 | A | 3/1996 | Linde et al. | |
| 5,547,208 | A | 8/1996 | Chappell et al. | |
| 6,056,076 | A * | 5/2000 | Bartel et al. | 180/167 |
| 6,463,773 | B1 | 10/2002 | Dimig | |
| 6,883,839 | B2 * | 4/2005 | Belmond et al. | 292/201 |

OTHER PUBLICATIONS

International Search Report dated Mar. 14, 2005.

* cited by examiner

*Primary Examiner*—Albert W Paladini
*Assistant Examiner*—Carlos Amaya
(74) *Attorney, Agent, or Firm*—Clark Hill PLC

(57) ABSTRACT

A latching assembly is used on a door of a motor vehicle, wherein the motor vehicle includes a main electric supply and a striker. The latching assembly includes a ratchet that is selectively rotatable with respect to the striker to latch and unlatch the door. The latching assembly includes a pawl that is selectively engagable with the ratchet to selectively prevent the ratchet from rotating. The latching assembly includes a motor which is electrically connected to the main electric power supply. The motor is operatively connected to the pawl for pivoting the pawl into and out of engagement with the ratchet. The latching assembly also includes a backup battery disposed adjacent the motor for supplying electric power when the motor is disconnected from the main electric supply.

7 Claims, 3 Drawing Sheets

E-LATCH WITH MICROCONTROLLER ONBOARD LATCH AND INTEGRATED BACKUP SENSOR

CROSS REFERENCE TO RELATED APPLICATIONS

This is a National Stage application and claims priority to and all the benefits of International Application No. PCT/CA2004/01958, filed on Feb. 8, 2007, which claims priority to and all the benefits of U.S. Provisional Application No. 60/519,499, filed on Nov. 13, 2003 and entitled "E-Latch With Microcontroller Onboard Latch And Integrated Backup Energy."

FIELD OF THE INVENTION

The invention relates to a door latch. More specifically, the invention relates to an electrical door latch for a motor vehicle that does not have a manual backup.

DESCRIPTION OF THE RELATED ART

It is desirable to have electrically activated side door latches in motor vehicles. The problem with such electrically activated side door latches is they lack the ability to have the latch be activated to release and open the side door in a failure mode, such as when the motor vehicle is in an accident. In such situations, the power cable connecting the battery to the electrically activated side door latch may be severed preventing the latch from operating correctly.

To avoid this situation, the latch typically has a mechanical release which serves as a backup to the electrically activated side door latch. The redundant mechanical release that acts as a backup to the electrically activated side door latch adds weight and assembly costs and further limits the design of the door. Therefore, there is a need in the art to eliminate the mechanical release.

SUMMARY OF THE INVENTION

A latching assembly is used on a door of a motor vehicle, wherein the motor vehicle includes a main electric supply and a striker. The latching assembly includes a ratchet that is selectively rotatable with respect to the striker to latch and unlatch the door. The latching assembly includes a pawl that is selectively engagable with the ratchet to selectively prevent the ratchet from rotating. The latching assembly includes a motor which is electrically connected to the main electric power supply. The motor is operatively connected to the pawl for pivoting the pawl into and out of engagement with the ratchet. The latching assembly also includes a backup battery disposed adjacent the motor for supplying electric power when the motor is disconnected from the main electric supply.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
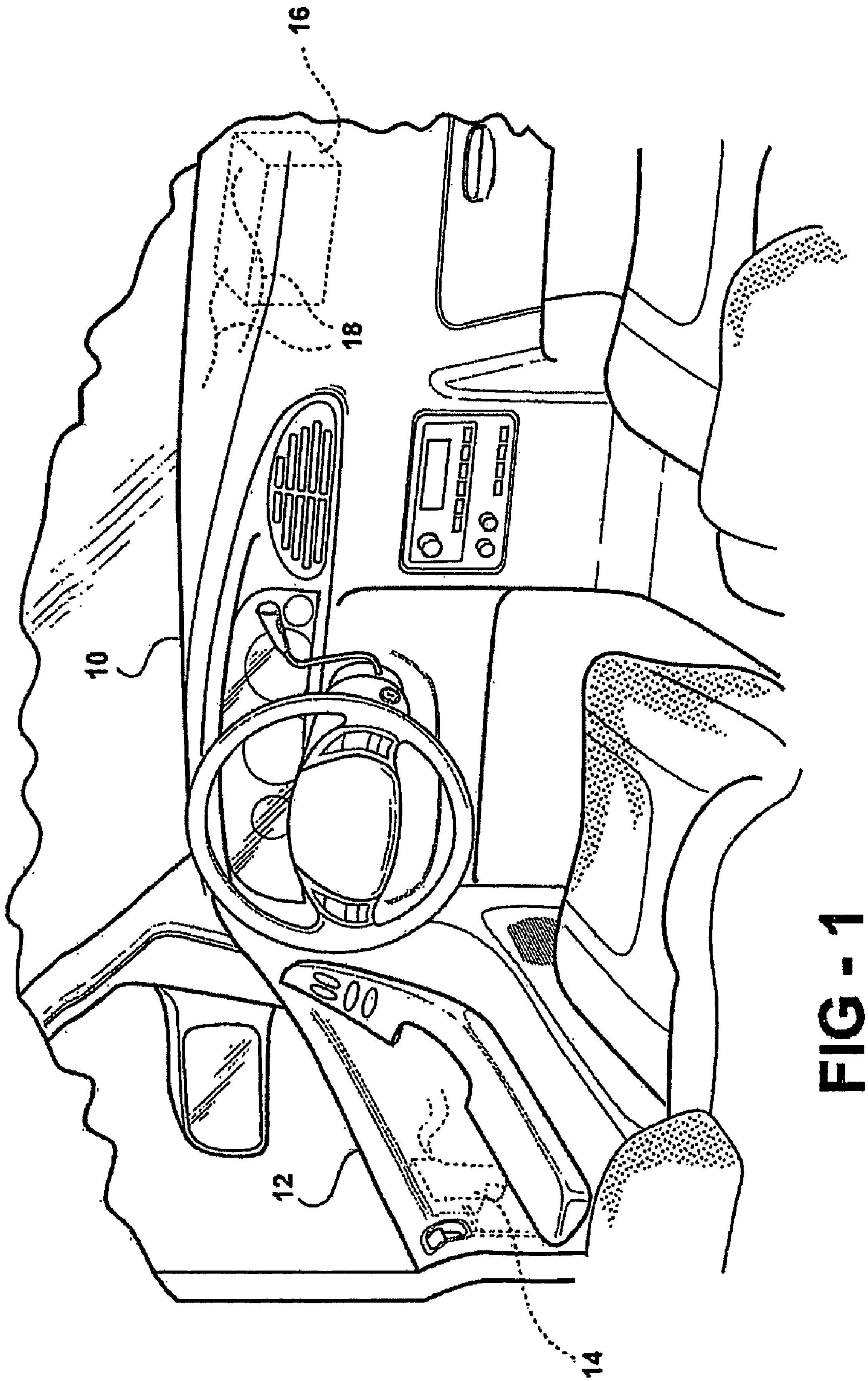
FIG. 1 is a fragmentary perspective view of a motor vehicle incorporating one embodiment of the invention.

Referring to FIG. 1, a motor vehicle 10 includes at least one side door 12. The side door 12 is movable between an open position and a closed position. A latching assembly generally indicated at 14, latches the side door 12 in the closed position during normal operation of the motor vehicle 10.

The latching assembly 14 is an electrical latching assembly. The latching assembly 14 is electrically connected to an electric power source 16 via an electrical system 18. The electric power source 16 is shown as a car battery, but it should be appreciated by those skilled in the art that the electricity may come from a power source other than a battery, e.g., an alternator. These electric power-generating devices are generally referred to as the electric power source 16 hereinafter.

Figure 2:
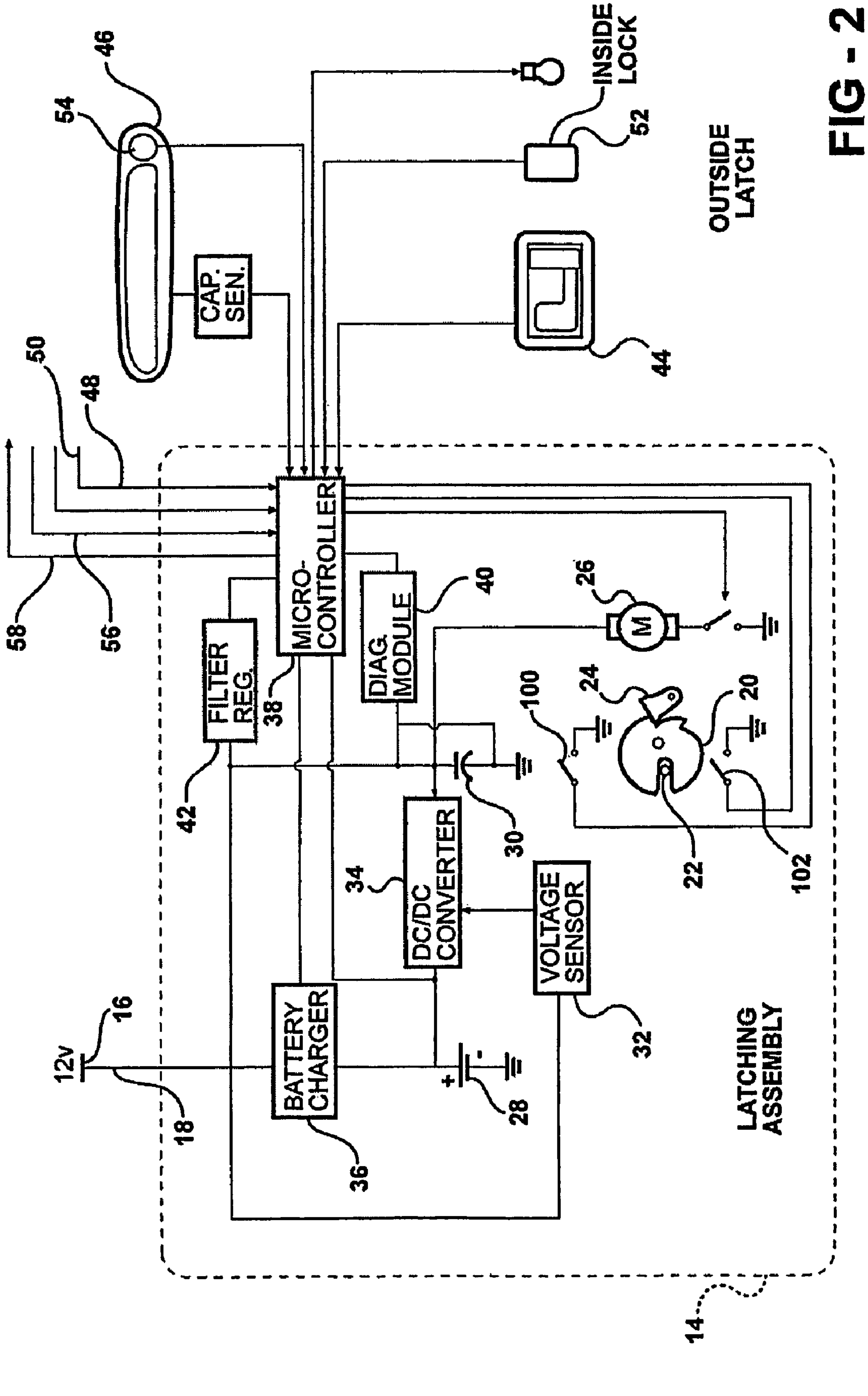
FIG. 2 is a schematic block diagram view of the invention.

Referring to FIG. 2, a graphic representation of the latching assembly 14 is shown. The latching assembly 14 includes a ratchet 20 which is selectively rotatable to engage a striker 22. The striker 22 is disposed along the A pillar or B pillar (neither shown) of the motor vehicle 10. When the ratchet 20 is rotated into a latching position with respect to the striker 22, the side door 12 is in a closed position. A pawl 24 selectively engages the ratchet 20 to prevent the ratchet 20 from rotating. Because the latching assembly 14 is electronic, the pawl 24 is moved by a motor 26 between an engaged position (shown in FIG. 2) and a non-engaged position allowing the ratchet 20 to rotate.

The latching assembly 14 includes a backup battery 28. The backup battery 28 is electrically connected to the electrical system 18. Should the electrical system 18 be severed such that the electric power source 16 is no longer able to power the latching assembly 14, the backup battery 28 can do so. The backup battery 28 is disposed adjacent the motor 26 within the latching assembly 14. The backup battery 28 is of a size sufficient to operate the latching assembly 14 allowing the motor 26 to unlatch the striker 22 to open the side door 12. It is contemplated that the backup battery 28 is also a 12 Volt battery. It should be appreciated by those skilled in the art that the size of the backup battery 28 would depend on, among other things, the operational requirements of the motor 26 and the force required to overcome the seal of the side door 12.

The latching assembly 14 also includes a capacitive element 30 operatively connected between the backup battery 28, the electric power source 16, and the motor 26. The capacitive element 30 that is capable of being used immediately upon the severing of the electrical system 18 preventing the electric power source 16 from operating the motor 26. The capacitive element 30 will be discussed in greater detail subsequently.

The latching assembly 14 also includes a voltage sensor 32 which senses the voltage on the electrical system 18 to determine whether the backup battery 28 is to be employed. The latching assembly also includes a DC/DC converter 34. The DC/DC converter 34 charges and maintains the capacitive element 30 in its charged state. The DC/DC converter 34 is electrically connected to the voltage sensor 32, the backup battery 28 and the capacitive element 30. A battery charger 36 is electrically connected between the electric power source 16 and the backup battery 28. The battery charger 36 charges the backup battery 28 whenever the electric power source 16 and the electrical system 18 are operating properly to maintain the backup battery 28 in a condition where it can be utilized should the electrical system 18 fail.

The latching assembly 14 also includes a microcontroller 38 which controls all of the elements set forth above. The microcontroller 38 controls the charger 36, monitors the backup battery 28, receives signals from a diagnostic module 40 regarding the condition of the capacitive element 30 and receives power through a filter regulator 42. The filter regulator 42 includes a regulator which provides the five volts necessary to operate the microcontroller 38. In addition, the microcontroller 38 receives inputs from several different sensors outside the latching assembly 14. In particular, the microcontroller 38 receives an input from an inside handle 44, an outside handle 46, a crash sensor 48, a key lock sensor 50, an inside lock switch 52, an outside lock switch 54 and the like. The microcontroller 38 also may receive communication through a communication line 56 and transmit information through a transmission line 58.

Figure 3:
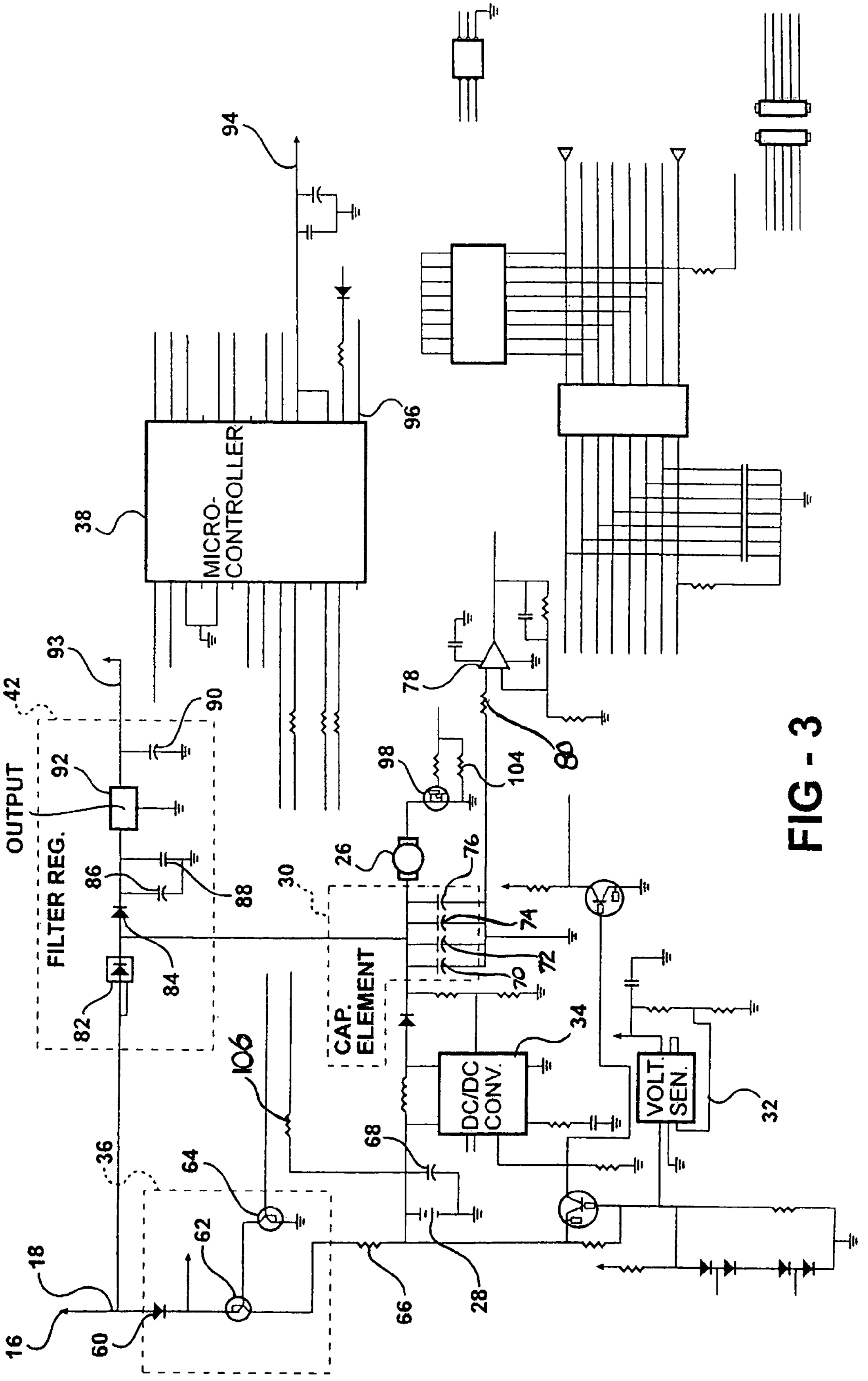
FIG. 3 is an electrical schematic of one embodiment of the circuit used in the invention.

Referring to FIG. 3, an electric schematic of the electronics utilized by the latching assembly 14 are shown, wherein similar reference characters refer to the generic elements disclosed above and shown in FIGS. 1 and 2. The battery charger 36 is electrically connected to the electric power source 16 through the electrical system 18. The battery charger 36 includes a discharge protection diode 60, two transistors 62, 64 and a resistor 66. The battery charger 36 is electrically connected to the backup battery 28, which is connected in parallel with a capacitor 68 between the electric power source 16 and ground. The DC/DC converter 34 is connected between the backup battery 28 and the capacitive element 30. In the embodiment shown in FIG. 3, the capacitive element 30 includes four capacitors 70, 72, 74, 76. Each of these four capacitors 70-76 are connected to ground and to an amplifier 78 through a resistor 80. The amplifier 78 is a portion of the diagnostics module 40 that identifies when something is wrong with the latching assembly 14 and its ability to receive power from the electric power source 16.

Turning attention to the top of the schematic, the filter regulator 42 is shown. The filter regulator 42 includes diodes 82, 84, three capacitors 86, 88, 90 and a regulator 92. The filter regulator 42 has an output at 93 which is electrically connected to an input 94. The microcontroller 38 also has various inputs, as was discussed above and are shown herein.

The voltage sensor 32 is connected to various electrical components and is used to determine when the electric power source 16 has a voltage output that drops below nine volts. The voltage sensor 32 is connected between the electric power source 16, the backup battery 28, and the microcontroller 38. It should be appreciated that the voltage sensor 32, along with the various components electrically connected to the voltage sensor 32 can be modified to change the threshold below which the voltage sensor 32 identifies when the voltage from the electric power source 16 is too little.

Under normal conditions, the microcontroller 38 will obtain its power from the electric power source 16 through the filter regulator 42. The microcontroller 38 will listen for input signals which take the form of lock/unlock commands or release commands. These commands primarily come from signals from sensors relating to the inside 44 and outside 46 handles, the inside 52 and outside 54 locks and the passive entry unlock commands. The microcontroller 38 also receives an input from a crash sensor through input 96.

When an appropriate combination of inputs and logic occur that would require a release, the microcontroller 38 will activate a switch 98. In the embodiment shown, the switch 98 is a field effect transistor. This will allow power from the electric power source 16 to flow to the motor 26. During this time, the microcontroller 38 monitors switches identifying open and ajar conditions. The open switch 100 and ajar switch 102 are shown in FIG. 2. The microcontroller 38 monitors these switches 100, 102 to determine that the unlatching of the latching assembly 14 was successfully completed.

As was discussed above, the capacitors 70-76 are shown in parallel supply to the electric power source 16. This connection is designed so that these capacitors 70-76 will always be charged to 12 volts. In the event of power loss, energy would be instantly available to open the latching assembly 14, without having to wait for the DC/DC converter to charge the capacitor 70, 76.

To maintain the backup battery 28, the micorcontroller 38 will monitor the backup battery 28 through a supervision channel 106. If it is determined that the voltage is too low, the constant current battery charger 36 will charge the backup battery 28. In the examples shown, the backup battery 28 is a NiMH battery.

Under normal conditions, at least three diagnostic mechanisms exist to allow the microcontroller 38 to monitor the critical components of the latching assembly 14. The backup battery 28 has a voltage which can be monitored during recharging. If the recharging for a certain period of time does not cause the expected rise of voltage in the backup battery 28, the latching assembly 14 may determine that the backup battery 28 is worn and may signal the user in an appropriate fashion.

The leakage current from the capacitors 70-76 are also monitored through the amplifier 78 and its associated electronic components. Any deviation from the expected leakage current may indicate a capacitor failure and this too would be signaled to the user.

In addition to this method of capacitive health detection, it is noted that when the motor 26 is turned on, the energy consumed by it will first come from the capacitors 70-76, even under normal conditions. This is because the high instantaneous current requirement of the motor 26 can be filled by the capacitors 70-76 before it can be filled by the electric power source 16. The result in the partial discharge of the capacitors 70-76 is monitored and compared with an expected profile, stored in the microcontroller 38, to determine the health of the capacitors 70-76.

An emergency is defined as when the voltage provided by the electric power source 16 drops below nine volts. When this occurs, the voltage sensor 32 automatically and independently enables the DC/DC converter 34, which will charge the capacitors 70-76 to about 16 volts in anticipation for the need for an emergency release.

During the transition from main power to backup power, the microcontroller 38 continues to draw a current from its five-volt supply. The energy first will come from the capacitor 90, and then from the regulator 92. The regulator 92 will continue to be fed from the charge of the backup capacitors 70-76. During this time, the DC/DC converter 34 is starting up and takes over responsibility for the charging of the capacitors 70-76. But during this time, the capacitors 70-76 will supply enough energy to the microcontroller 38 to prevent it from rebooting. Should the DC/DC converter fail to start up in time, a reboot may occur, which should not have any detrimental effect to the operation of the latching assembly 14. The microcontroller 38 will then drop into a low power mode to draw as little power from the DC/DC converter 34 as possible.

During the emergency mode, the latching assembly 14 and the microcontroller 38 will be ready to respond to any release request. Inside 52 and outside 54 locks will function normally if the latch state is unlocked. The inside unlock switch will also produce the expected result. A signal from the crash sensor or key fob ordering an unlock will be honored. Once the microcontroller 38 determines that an unlatch is necessary in emergency mode, the switch 98 will be closed and the energy from the capacitors 70-76 will drain through the motor 26, resulting in the rotation thereof. The discharge will last as long as the switch 98 is turned on. The switch 98 should remain on as long as the microcontroller 38 has power and is turning it on. The switch 98 should turn off normally under microcontroller control. If the microcontroller 38 loses power during the actuation of the motor 26, however, a pull down 104 will turn the switch 98 off.

The DC/DC converter 34 will immediately begin to recharge the capacitors 70-76. In the event the capacitors 70-76 are discharged too deeply and take too long to recover voltage, the microcontroller 38 may reboot. Upon reboot, the microcontroller 38 will restart, look at the open switch 100 and determine that the latch was successfully released. For subsequent releases, the microcontroller 38 will monitor the voltages of the capacitors 70-76. Any attempt to unlatch the latch assembly 14 again before the capacitors 70-76 are recharged to a minimum voltage for successful release will cause the release command to be noted and delayed slightly.

The above-described embodiments of the invention are intended to be examples of the present invention and alterations and modifications may be effected thereto, by those skilled in the art, without departing from the scope of the invention which is defined solely by the claims appended hereto.

What is claimed:

1. A latching assembly for a door of a motor vehicle having a main electric power supply and a striker, said latching assembly comprising:

a ratchet selectively rotatable with the striker to latch and unlatch the door;

a pawl selectively engagable with said ratchet to selectively prevent said ratchet from rotating;

a motor electrically connected to the main electric power supply and operatively connected to said pawl for pivoting said pawl into and out of engagement with said ratchet;

a backup battery disposed adjacent said motor for supplying electric power when said motor is disconnected from the main electric power supply;

a battery charger electrically connected to the main electric power supply and said backup battery, said battery charger adapted for charging said backup battery;

a capacitive element storing a charge for immediate discharge to said motor when said motor is disconnected from the main electric power supply;

a diagnostics module electrically connected to said capacitive element, said diagnostics module monitoring a leakage current of said capacitive element; and a microcontroller electrically connected to said backup battery, said battery charger, and said diagnostics module, said microcontroller monitoring a voltage of said backup battery and controlling said battery charger in response to detecting a low voltage of said backup battery, said microcontroller monitoring the recharging of said backup battery to determine whether said backup battery is worn, said microcontroller receiving signals from said diagnostics module related to said leakage current to determine a failure of said capacitive element, and said microcontroller monitoring the discharge of said capacitive element when said motor is disconnected from the main electric power supply to determine the health of said capacitive element.

2. A latching assembly as set forth in claim 1 including a voltage sensor for sensing the voltage provided by the main electric power supply.

3. A latching assembly as set forth in claim 2 including a converter for charging and maintaining said capacitive element.

4. A latching assembly as set forth in claim 3 wherein said converter is a DC/DC converter.

5. A latching assembly as set forth in claim 4 wherein said capacitive element includes a plurality of capacitors.

6. A latching assembly as set forth in claim 5 wherein said microcontroller monitors said plurality of capacitors.

7. A latching assembly for a door of a motor vehicle having a main electric power supply and a striker, said latching assembly comprising:

a ratchet selectively rotatable with the striker to latch and unlatch the door;

a pawl selectively engagable with said ratchet to selectively prevent said ratchet from rotating;

a motor electrically connected to the main electric power supply and operatively connected to said pawl for pivoting said pawl into and out of engagement with said ratchet;

a backup battery disposed adjacent said motor for supplying electric power when said motor is disconnected from the main electric power supply;

a battery charger electrically connected to the main electric power supply and said backup battery, said battery charger adapted for charging said backup battery;

a capacitive element storing a charge for immediate discharge to said motor when said motor is disconnected from the main electric power supply;

a diagnostics module electrically connected to said capacitive element, said diagnostics module monitoring a leakage current of said capacitive element; and a microcontroller electrically connected to said diagnostics module, said microcontroller receiving signals from said diagnostics module related to said leakage current to determine a failure of said capacitive element, and said microcontroller monitoring the discharge of said capacitive element when said motor is disconnected from the main electric power supply to determine the health of said capacitive element.

* * * * *